United States Patent
Samad et al.

(10) Patent No.: US 11,288,137 B2
(45) Date of Patent: Mar. 29, 2022

(54) RESTORATIONS OF VIRTUAL MACHINES IN VIRTUAL SYSTEMS USING A RESTORATION POLICY

(71) Applicant: EMC IP Holding Company LLC, Hopkinton, MA (US)

(72) Inventors: Mohammed Samad, Bangalore (IN); Shelesh Chopra, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 146 days.

(21) Appl. No.: 16/510,760

(22) Filed: Jul. 12, 2019

(65) Prior Publication Data
US 2021/0011814 A1    Jan. 14, 2021

(51) Int. Cl.
| | |
|---|---|
| *G06F 11/14* | (2006.01) |
| *G06F 9/455* | (2018.01) |
| *G06F 9/50* | (2006.01) |
| *G06F 9/48* | (2006.01) |

(52) U.S. Cl.
CPC ...... *G06F 11/1469* (2013.01); *G06F 9/45558* (2013.01); *G06F 9/4881* (2013.01); *G06F 9/5077* (2013.01); *G06F 11/1484* (2013.01)

(58) Field of Classification Search
None
See application file for complete search history.

(56) References Cited

U.S. PATENT DOCUMENTS

| | | | |
|---|---|---|---|
| 9,092,248 B1* | 7/2015 | Makin | G06F 11/1402 |
| 9,128,627 B1* | 9/2015 | Bachu | G06F 11/1456 |
| 9,760,448 B1* | 9/2017 | Per | G06F 3/0647 |
| 10,776,041 B1* | 9/2020 | Chopra | G06F 3/0664 |
| 11,163,647 B2* | 11/2021 | Chopra | G06F 9/45558 |
| 2010/0306486 A1* | 12/2010 | Balasubramanian | G06F 11/1469 711/162 |
| 2017/0286234 A1* | 10/2017 | Shulga | G06F 9/4401 |
| 2020/0334108 A1* | 10/2020 | Raghunathan | G06F 16/951 |
| 2020/0341638 A1* | 10/2020 | Anand | G06F 11/1469 |
| 2020/0341852 A1* | 10/2020 | Chopra | G06F 11/1451 |
| 2020/0341857 A1* | 10/2020 | Chopra | G06F 11/1451 |
| 2020/0341858 A1* | 10/2020 | Chopra | G06F 11/1461 |
| 2020/0364071 A1* | 11/2020 | Chopra | G06F 11/1461 |

\* cited by examiner

*Primary Examiner* — Brian R Peugh
*Assistant Examiner* — Marwan Ayash
(74) *Attorney, Agent, or Firm* — Chamberlain, Hrdlicka, White, Williams & Aughtry (57) ABSTRACT

A method for restoring virtual machines in accordance with one or more embodiments of the invention includes obtaining, by a data protection manager, a restoration request, and in response to the restoration request: identifying a plurality of virtual machines (VMs) to restore based on the restoration request, determining a restoration process based on the plurality of virtual machines, and initiating a deployment of a production agent based on the restoration process, wherein the production agent initiates a restoration on at least a portion of the plurality of VMs.

14 Claims, 8 Drawing Sheets

RESTORATIONS OF VIRTUAL MACHINES IN VIRTUAL SYSTEMS USING A RESTORATION POLICY

BACKGROUND

Computing devices may include any number of internal components such as processors, memory, and persistent storage. Each of the internal components of a computing device may be used to generate data and to execute functions. The process of generating, storing, and sending data may utilize computing resources of the computing devices such as processing and storage. The utilization of the aforementioned computing resources to generate data and to send data to other computing devices may impact the overall performance of the computing resources.

SUMMARY

In general, in one aspect, the invention relates to a method for performing virtual machine restorations in accordance with one or more embodiments of the invention. The method includes obtaining, by a data protection manager, a restoration request, and in response to the restoration request: identifying a plurality of virtual machines (VMs) to restore based on the restoration request, determining a restoration process based on the plurality of virtual machines, and initiating a deployment of a production agent based on the restoration process, wherein the production agent initiates a restoration on at least a portion of the plurality of VMs.

In one aspect, the invention relates to a non-transitory computer readable medium in accordance with one or more embodiments of the invention, which includes computer readable program code, which when executed by a computer processor enables the computer processor to perform a method for performing virtual machine restorations. The method includes obtaining, by a data protection manager, a restoration request, and in response to the restoration request: identifying a plurality of virtual machines (VMs) to restore based on the restoration request, determining a restoration process based on the plurality of virtual machines, and initiating a deployment of a production agent based on the restoration process, wherein the production agent initiates a restoration on at least a portion of the plurality of VMs.

In one aspect, the invention relates to a system in accordance with in one or more embodiments of the invention, which includes a processor and memory which includes instructions, which when executed by the processor, perform a method for performing virtual machine restorations. The method includes obtaining, by a data protection manager, a restoration request, and in response to the restoration request: identifying a plurality of virtual machines (VMs) to restore based on the restoration request, determining a restoration process based on the plurality of virtual machines, and initiating a deployment of a production agent based on the restoration process, wherein the production agent initiates a restoration on at least a portion of the plurality of VMs.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing restorations of virtual machines. Embodiments of the invention manage the restorations by identifying virtual machines in a system to be restored, and configuring one or more production agents to restore the virtual machines to a specified point in time based on the groupings of the virtual machines. The production agents may be deployed to the production hosts to perform the restoration in accordance with the configuration.

Further, embodiments of the invention relate to a method for updating a restoration policy repository based on changes made to the system. The changes may include adding or removing an entity (e.g., a virtual machine, a component of a virtual machine, etc.) from the system, or modifying the entity to provide a different functionality. Embodiments of the invention may include identifying the change, determining whether the change impacts one or more restoration policies of the restoration policy repository, and if the change does impact a restoration policy, updating the restoration policy based on the change.

Figure 1A:
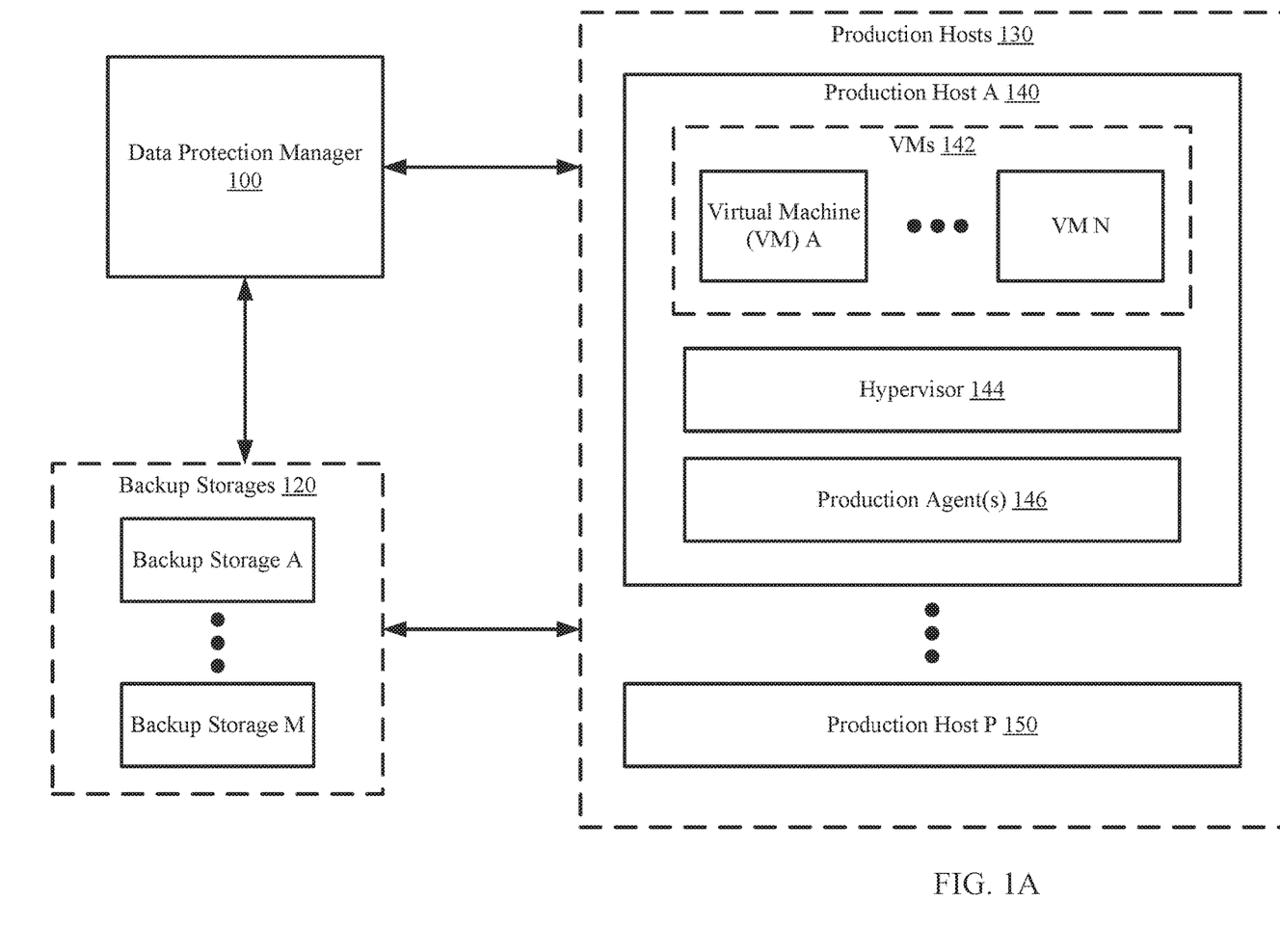
FIG. 1A shows a diagram of a system in accordance with one or more embodiments of the invention.

FIG. 1A shows an example system in accordance with one or more embodiments of the invention. The system includes a data protection manager (100), one or more production hosts (130) and backup storages (120). The system may include additional, fewer, and/or different components without departing from the invention. Each component may be operably connected to any of the other components via any combination of wired and/or wireless connections. Each component illustrated in FIG. 1A is discussed below.

In one or more embodiments of the invention, the data protection manager (100) manages the protection of data generated by the production hosts (130). The data protection manager may manage the protection of data by implementing backup policies for virtual machines (142) executing on the production hosts (140). The backup policies may specify how to back up the virtual machines (142) and to store the backups in the backup storages (120).

In one or more embodiments of the invention, the data protection manager (100) manages the protection of the data by implementing methods for restoring the virtual machines (142) using the backups stored in the backup storages (120). The virtual machines may be restored using restoration policies, implemented by the data protection manager (100), that each specify a restoration process for restoring one or more virtual machines.

Figure 4:
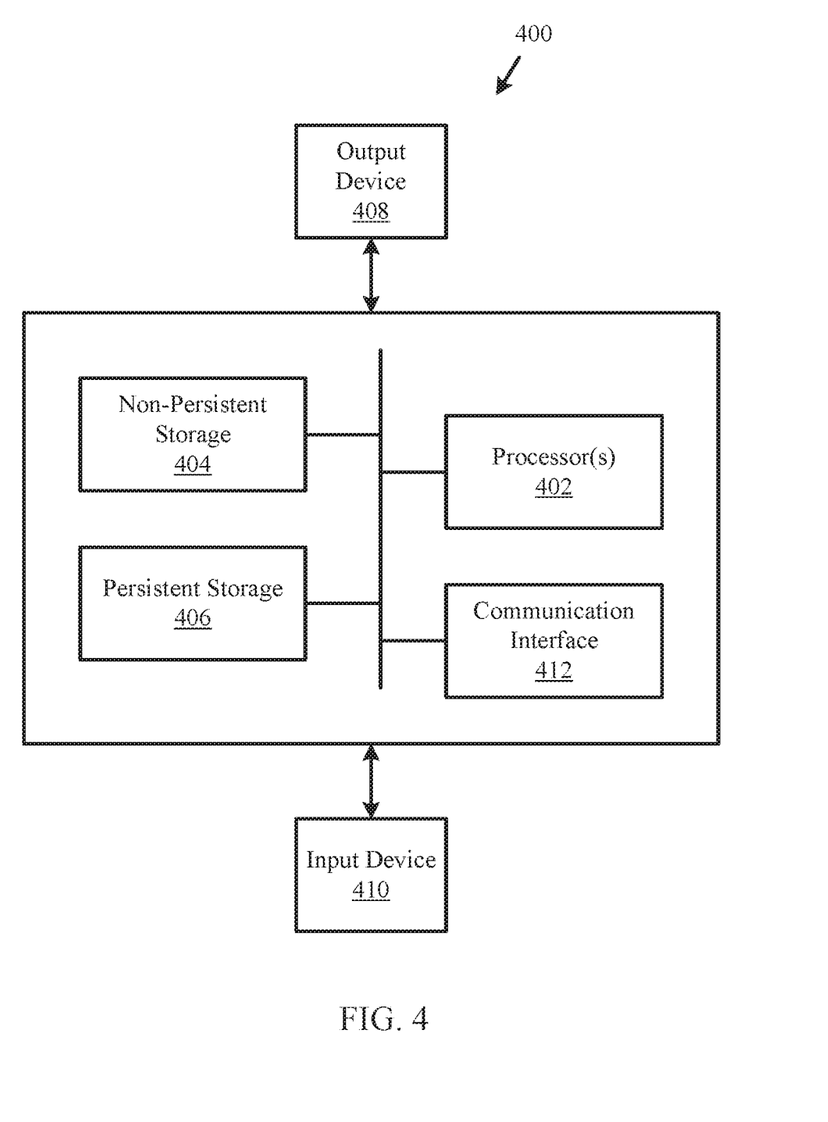
FIG. 4 shows a diagram of a computing device in accordance with one or more embodiments of the invention.

In one or more embodiments of the invention, the data protection manager (100) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data protection manager (100) described throughout this application and/or all, or a portion thereof, of the methods illustrated in FIGS. 2A-2C.

In one or more embodiments of the invention, the data protection manager (100) is implemented as a logical device. The logical device may utilize the computing resources of any number of computing devices and thereby provide the functionality of the data protection manager (100) described throughout this application and/or all, or a portion thereof, of the methods illustrated in FIGS. 2A-2C. For additional details regarding the data protection manager, see, e.g., FIG. 1B.

In one or more embodiments of the invention, the production hosts (130) host virtual machines (VMs) (142). The VMs (142) may be logical entities executed using computing resources (not shown) of the production host (130). Each of the virtual machines (142A, 142N) may be performing similar or different processes. In one or more embodiments of the invention, the VMs (142) provide services to users, e.g., clients (not shown). For example, the VMs (142) may host components. The components may be, for example, instances of databases, email servers, and/or other applications. The VMs (142) may host other types of components without departing from the invention.

In one or more embodiments of the invention, the production hosts (130) each include a hypervisor (144) that orchestrates the operation of the VMs (142). The hypervisor (144) may orchestrate the operation of the VMs (142) by allocating computing resources to each virtual machine (142A, 142N).

Further, the hypervisor (144) may provide information about the virtual machines (142) of a production host (e.g., 140) to the data protection manager (100) as requested by the data protection manager (100), during periodic intervals, after a change in the system is detected by the hypervisor (100), and/or based on any other occurrence without departing from the invention.

In one or more embodiments of the invention, the hypervisor (144) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the hypervisor (144) described throughout this application.

In one or more of embodiments of the invention, the hypervisor (144) is implemented as computer instructions, e.g., computer code, stored on a persistent storage that when executed by a processor of the production host (140) cause the production host (140) to provide the functionality of the hypervisor (144) described throughout this application.

In one or more embodiments of the invention, the production host (140) includes one or more production agents (146). A production agent may include functionality for generating backups of one or more virtual machines (142A, 142N), storing the backups in the backup storages (120), and/or obtaining the backups from the backup storages (120) when restoring the virtual machines (142A, 142N).

In one or more embodiments of the invention, the production agent(s) (146) are installed by the data protection manager (100) and configured to perform the aforementioned functionality. The configuration performed by the data protection manager (100) may be based on backup policies implemented by the data protection manager (100). The data protection manager (100) may install the production agents (146) at a prior point in time and configure the installed production agents while implementing the backup policies. In one or more embodiments of the invention, the production agents (146) are installed by the data protection manger (100) while implementing the backup policies.

In one or more embodiments of the invention, the production agent (146) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the production agent (146) described throughout this application.

In one or more of embodiments of the invention, the production agent (146) is implemented as computer instructions, e.g., computer code, stored on a persistent storage that when executed by a processor of the production host (140) cause the production host (140) to provide the functionality of the production agent (146) described throughout this application.

In one or more of embodiments of the invention, the virtual machines (142) are implemented as computer instructions, e.g., computer code, stored on a persistent storage (e.g., on a production host (140)) that when executed by a processor(s) of the production host (140) cause the production host (140) to provide the functionality of the virtual machines (142) described throughout this application.

In one or more embodiments of the invention, each of the production hosts (140, 150) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host (140, 150) described throughout this application.

In one or more embodiments of the invention, each of the production hosts (140, 150) is implemented as a logical device. The logical device may utilize the computing resources of any number of computing devices and thereby provide the functionality of the production host (140, 150) described throughout this application.

In one or more embodiments of the invention, the backup storages (120) store backups of the virtual machines (142). The backup storages (120) may communicate with the production agents (e.g., 146) of each production host when obtaining backups to be stored and/or when transferring backups to the production hosts (130) when restoring virtual machines.

In one or more embodiments of the invention, a backup is a copy of data associated with a virtual machine. A backup may further include additional data that enables a production agent to restore a virtual machine associated with the backup from any production host.

In one or more embodiments of the invention, a transport mode is used to transfer a backup to the backup storage. In one embodiment of the invention, the transport mode corresponds to the manner in which data is transmitted from a production host (140, 150) to a backup storage (120). Examples of transport modes include, but are not limited to, network block device (NBD) and HotAdd.

In one or more embodiments of the invention, each of the backup storages (120) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the backup storage described throughout this application.

In one or more embodiments of the invention, each of the backup storages (120) is implemented as a logical device. The logical device may utilize the computing resources of any number of computing devices and thereby provide the functionality of the backup storage described throughout this application.

Figure 1B:
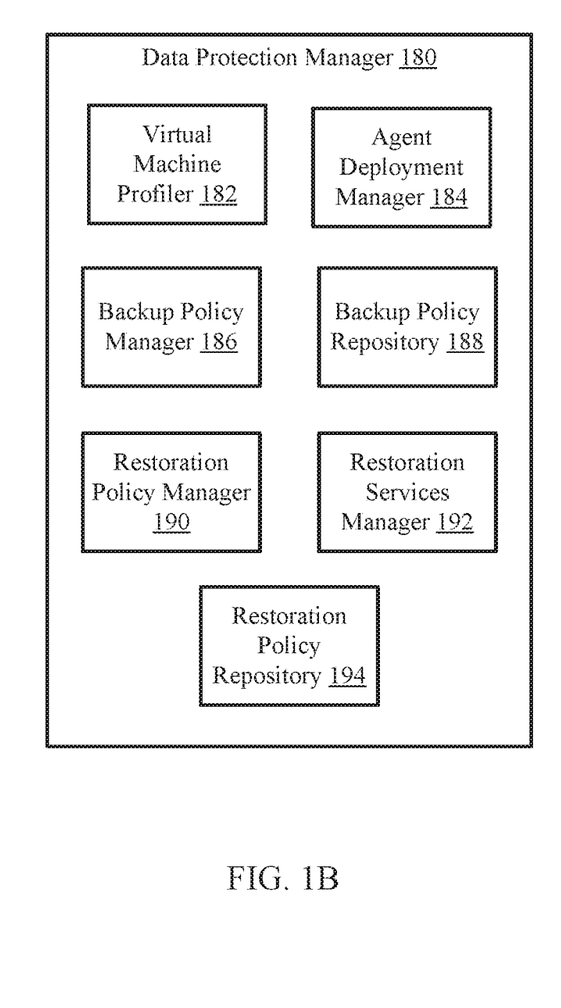
FIG. 1B shows a diagram of a data protection manager in accordance with one or more embodiments of the invention.

FIG. 1B shows a diagram of a data protection manager. The data protection manager (180) may be similar to the data protection manager (100, FIG. 1A) discussed above. As discussed above, the data protection manager (180) includes functionality for protecting the data generated by virtual machines. To perform the aforementioned functionality, the data protection manager (180) includes a virtual machine profiler (182), an agent deployment manager (184), a backup policy manager (186), a backup policy repository (188), a restoration policy manager (190), a restoration services manager (192), and a restoration policy repository (194).

The data protection manager (180) may include additional, fewer, and/or different components without departing from the invention. Each of the aforementioned components of the data protection manager (180) is discussed below.

In one or more embodiments of the invention, the virtual machine profiler (182) obtains information about virtual machines. The virtual machine information may specify, for example, virtual machines, or components of a virtual machines, added and/or removed from the system of FIG. 1A, changes to a functionality of a virtual machine, and/or other information about the system illustrated in FIG. 1A without departing from the invention.

The virtual machine information may be obtained using an application programming interface (API) that interacts with a component of the production host (e.g., a production agent and/or a hypervisor) executing on a production host. The component communicating with the virtual machine profiler (182) may perform a profiling on the virtual machines to obtain virtual machine information. The virtual machine information may be sent to the virtual machine profiler (182). The profiling may be performed periodically.

In one or more embodiments of the invention, the component sends an update to the virtual machine profiler (182) in which the update specifies VM information. The component may send it periodically and/or after a change is identified by the component.

In one or more embodiments of the invention, the agent deployment manager (184) initiates the deployment of production agents to the production hosts. The agent deployment manager (184) may initiate the deployment by configuring the production agents to perform a backup operation in accordance with backup policies and/or restorations (or restoration operations) in accordance with restoration policies. The agent deployment manager (184) may identify a backup policy that is to be implemented during a backup operation, install production agent(s) to a production host hosting the virtual machines (if the production agent(s) are not already installed), and configure the production agent(s) to perform the backup operation in accordance with the identified backup policy.

In one or more embodiments of the invention, the backup policy manager (186) updates a backup policy repository (188) based on virtual machine information obtained from the virtual machine profiler (182). The backup policy manager (186) may poll the virtual machine profiler (182) (e.g., periodically) for virtual machine information. The backup policy manager may obtain a response from the virtual machine profiler (182). The response may specify the requested virtual machine information. The response may be used by the backup policy manager (186) to determine whether a backup policy of the backup policy repository (188) is to be updated.

In one or more embodiments of the invention, the backup policy manager (186) implements the backup policies of the backup policy repository by triggering a backup request that is sent to a virtual machine profiler (182). The backup policy manager (186) may identify a point in time specified by a backup policy in which to perform a backup operation. The backup policy manager (186) may send a backup request at that point in time to the virtual machine profiler (182) to perform a backup operation in accordance with the backup policy.

In one or more embodiments of the invention, the backup policy repository (188) is a data structure that specifies backup policies of entities such as, for example, virtual machines or components of virtual machines. Each backup policy may specify the entity to be backed up using an identifier of the entity, a schedule for backing up the entity, a type of backup to be performed, and/or other information that may be useful for backing up the specified entity.

The other information may include, for example, whether a virtual machine is to be quiesced during a backup operation. In one or more embodiments of the invention, a virtual machine is quiesced when it is set to a state where it may not perform input/output operations (TOPS). One or more virtual machines may be set to a quiesced state during a backup operation to maintain consistency of a backup being generated during the backup operation. In one or more embodiments of the invention, a backup operation may be performed on a virtual machine without setting the virtual machine to a quiesced state.

Additionally, the other information may include, for example, specifying whether additional agents need to be installed in a virtual machine in order to perform a backup of the virtual machine. The additional agents may be used to back up applications executing on the virtual machine.

In one or more embodiments of the invention, the restoration policy manager (190) updates a restoration policy repository (194) based on the virtual machine information obtained from the virtual machine profiler (182). The restoration policy manager (190) may poll the virtual machine profiler (182) (e.g., periodically) for the virtual machine information. The virtual machine information may be used by the restoration policy manager (190) to determine whether a restoration policy of the restoration policy repository (188) is to be updated.

In one or more embodiments of the invention, the restoration services manager (192) implements a restoration policy of a restoration policy repository (194) after obtaining a request to restore one or more virtual machines. The restoration services manager (192) may identify virtual machines to be restored and determine an order in which to perform the restoration.

In one or more embodiments of the invention, the restoration services manager (192) is further programmed to analyze and determine whether components in the production host that aid in the restoration of the virtual machines are capable of performing their functionality. The restoration services manager (192) may be equipped with, for example, an application programming interface (API) that interfaces with any components and/or services running in the production host that may be used by a production agent to restore the virtual machines in the production hosts. The restoration services may perform the analysis and determination periodically (e.g., every hour, every day, etc.). If the restoration services manager (192) determines that a component or service is not able to perform its respective functionality, the restoration services manager may be programmed to notify the production host of the component's inability to perform the functionality.

The restoration policy repository (194) is a data structure that specifies restoration policies of entities such as, for example, virtual machines or components of virtual machines. Each restoration policy may specify the entity (or entities) to be restored using an identifier of the entity (or entities), a restoration process in which to restore the entity (or entities), and/or other information that may be useful for restoring the specified entity (or entities).

In one or more embodiments of the invention, the restoration process in which to restore an entity may include disabling automatic power-on of two or more entities and an order in which to power them on by a production agent executing the restoration process. For example, a restoration policy may specify that a first virtual machine may need to be powered on before a second virtual machine may be restored.

In one or more embodiments of the invention, the restoration policy may specify an interdependency of an entity to additional entities. For example, a restoration policy may specify that if a first virtual machine is to be restored, a second and a third virtual machine may need to be restored in addition to the first virtual machine. In one or more embodiments of the invention, a virtual machine A executing on a production host may depend on the operability of a virtual machine B. The dependency may be associated with data of virtual machine B that virtual machine A may utilize in order for the virtual machine A to operate. In such a case, the restoration policy may specify that virtual machine B is to be restored and powered on before virtual machine A.

In one or more embodiments of the invention, an interdependency of two or more virtual machines is characterized by the requirement for one virtual machine to be restored if a second virtual machine is requested to be restored. For example, the restoration policy may specify that if a virtual machine C is requested to be restored, virtual machine D would need to be restored as well to maintain data consistency between virtual machine C and virtual machine D. In this example, the order of restoration between virtual machine C and virtual machine D may not be relevant.

The invention is not limited to the aforementioned examples of restoration policies.

Figure 2A:
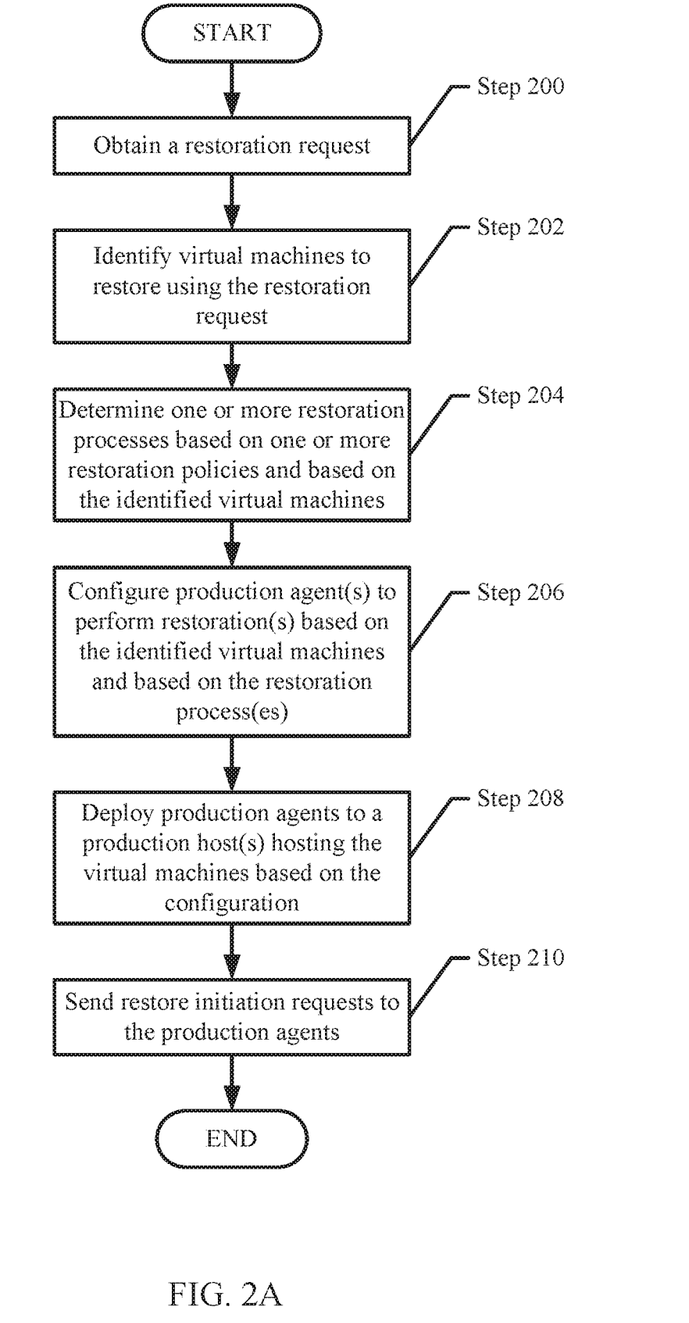
FIG. 2A shows a flowchart for managing restoration requests in accordance with one or more embodiments of the invention.
Figure 2B:
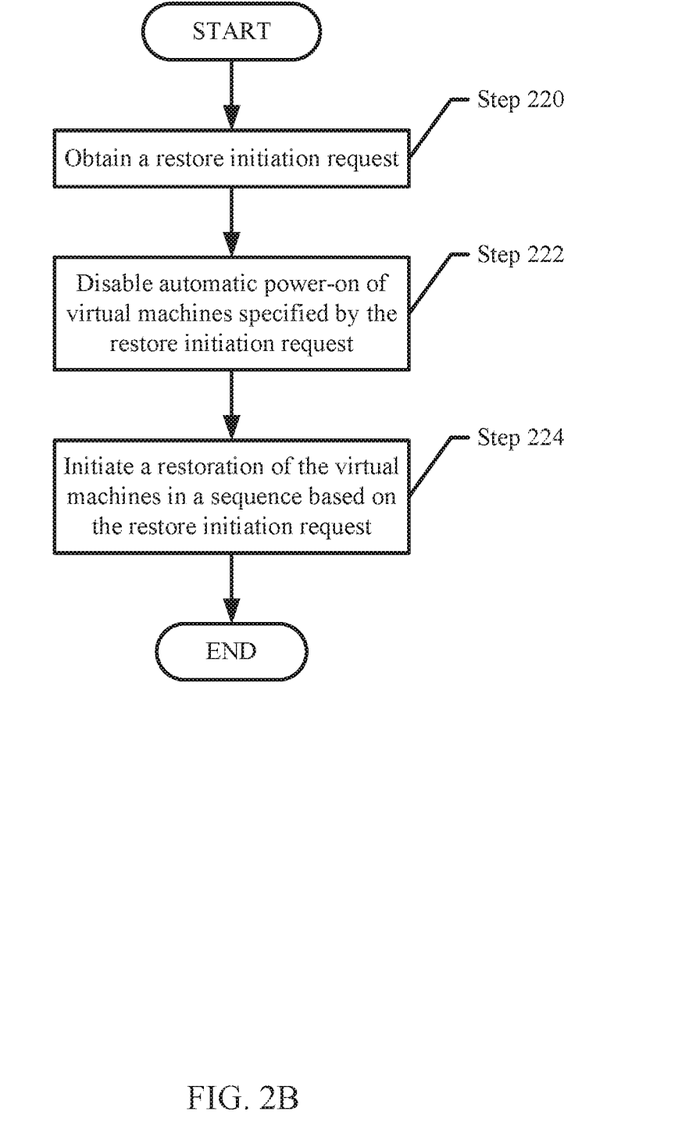
FIG. 2B shows a flowchart for implementing a restoration process in accordance with one or more embodiments of the invention.
Figure 2C:
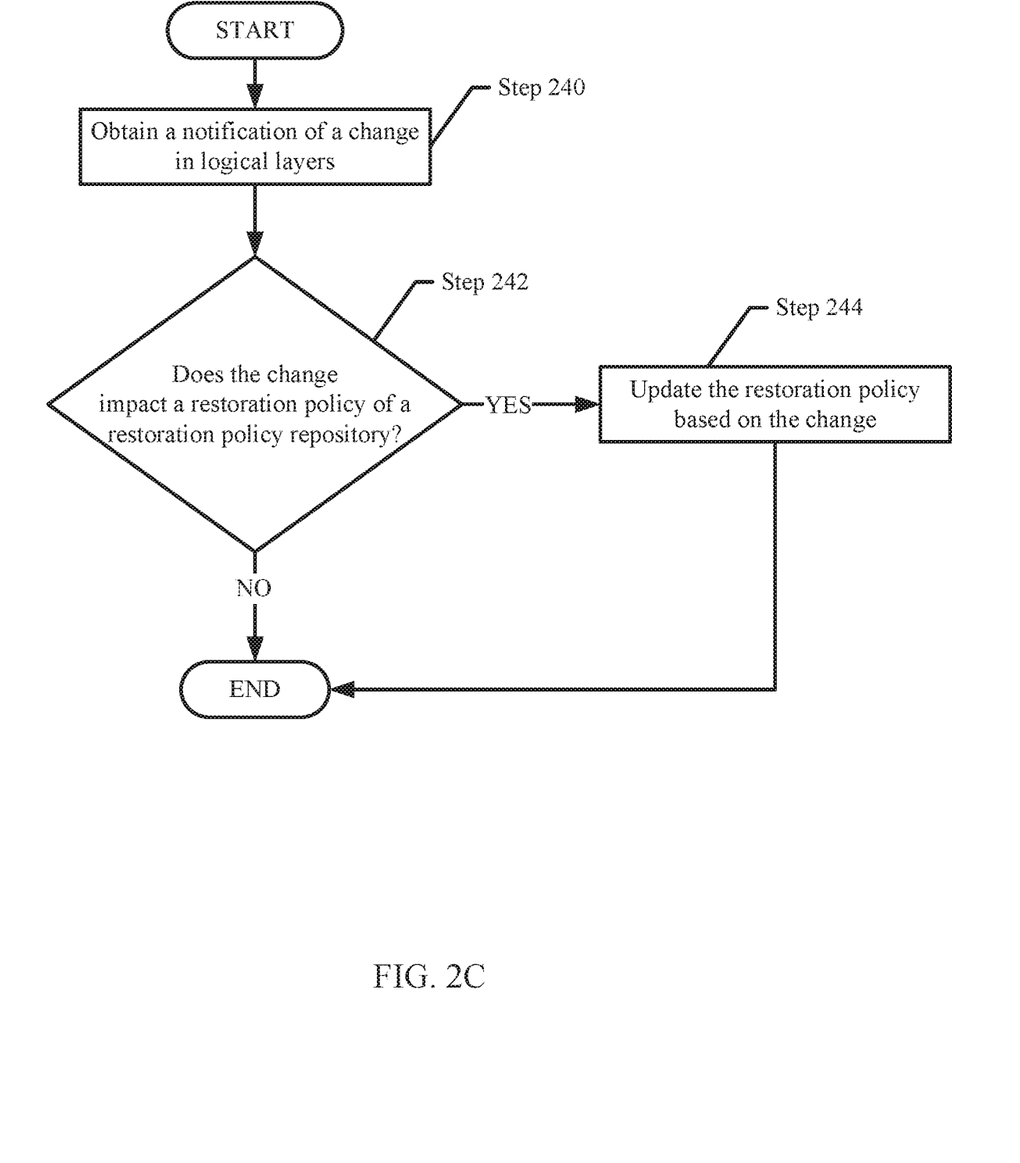
FIG. 2C shows a flowchart for managing a restoration policy repository in accordance with one or more embodiments of the invention.

FIGS. 2A-2C show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2C may be performed in parallel with any other steps shown in FIGS. 2A-2C without departing from the scope of the invention.

FIG. 2A shows a flowchart for managing restoration requests in accordance with one or more embodiments of the invention. The method shown in FIG. 2A may be performed by, for example, a data protection manager (100). FIG. 1A). Other components of the system illustrated in FIG. 1A may perform the method of FIG. 2A without departing from the invention.

Turning to FIG. 2A, in step 200, a restoration request is obtained. The restoration request may be obtained from a production host. The restoration request may specify one or more virtual machines to be restored. In one or more embodiments of the invention, the restoration request is obtained from a production host. The production host may specify virtual machines that it would like restored.

In step 202, virtual machines (VMs) to restore are identified using the restoration request. In one or more embodiments of the invention, the restoration request specifies VMs to be restored and, in such scenarios, the virtual machine profiler extracts this information from the restoration request. In another embodiment of the invention, the restoration request only specifies that a given production host or set of production hosts but does not specify the specific VMs to restore. In such scenarios, the virtual machine profiler queries the production host(s) to identify the VMs on each of the production hosts. Once the VMs are identified, the virtual machine profiler obtains virtual machine information of the identified virtual machines. The virtual machine information may be obtained by sending information requests to the production hosts hosting the identified virtual machines and obtaining a response that includes virtual machine information. In one or more embodiments of the invention, the virtual machine information is obtained from the virtual machine profiler. In other words, the virtual machine profiler sends the information requests to the production hosts prior to obtaining the restoration request and not in response to the restoration request.

In one or more embodiments of the invention, the virtual machine information may specify interdependencies between the virtual machines (some or which may not be have been originally identified in step 202). For example, consider a scenario in which a first virtual machine may operate as long as a second virtual machine is operating. If the second virtual machine is quiesced, the first virtual machine may not operate. Subsequently, the virtual machine information may specify that the first virtual machine is dependent on the second virtual machine. In one or more embodiments of the invention, the virtual machine profiler may analyze the virtual machine information to determine whether there are any interdependencies between any of the identified VMs and/or between any of the identified VMs and other VMs, which are not identified VMs.

In one or more embodiments of the invention, any virtual machines, that are not identified VMs (i.e., VMs not originally identified in step 202) and that depend on any identified virtual machine are each included as identified virtual machines to be restored. In this manner, application consistency is maintained between the identified virtual machines and the now identified additional dependent virtual machines.

In step 204, one or more restoration processes are determined based on one or more restoration policies and based on the identified virtual machines (including the originally identified virtual machines and the subsequently identified additional dependent virtual machines). In one or more embodiments of the invention, a restoration services manager of the data protection manager identifies one or more restoration policies that specify the identified VMs. The restoration policies may further specify any interdependencies between the identified VMs and/or an order in which to restore the VMs. For example, a first restoration policy may specify that for a first VM that depends on a second VM, the second VM has to be restored before the first VM may be restored. A second restoration policy may specify that a third VM is to be restored after the first VM. The restoration services manager may generate a restoration process that specifies the second VM being restored before the first VM and the third VM being restored after the first VM.

In one or more embodiments of the invention, the identified restoration policies specify one or more restoration processes. The restoration services manager may determine the restoration processes to use based on the virtual machines specified in the restoration processes. For example, if a restoration process specifies an order of virtual machines that have not been identified by the virtual machine profiler to be restored, the restoration services manager may determine to not have the restoration process performed to restore the identified virtual machines.

In one or more embodiments of the invention, the restoration services manager may further determine whether any of the identified VMs are to be quiesced prior to restoration. The restoration services manager may further update a restoration process to specify quiescing the virtual machines that are to be quiesced.

In one or more embodiments of the invention, the restoration processes further specify disabling an automatic power-on of the virtual machines to be restored. This may also include configuring the virtual machines to not power on automatically during the restoration. When a virtual machine is powered on, a user, or other entity, is able to read and write to the virtual machine. Accordingly, to minimize users or other entities interaction with the VM during the restoration process, the restoration process includes dictating an order in which to power on virtual machines undergoing a restoration.

In step 206, one or more production agents are configured to perform restorations on the identified VMs in accordance with the restoration process(es) determined in step 204. In one or more embodiments of the invention, an agent deployment manager of the data protection manager initiates a configuration of a production agent installed on a production host by applying one or more of the restoration processes for restoring each of the identified VMs. The restoration process may specify, for example, an order in which to restore the VMs. Each production agent may be configured to perform one or more of the restoration processes generated and/or identified in step 204.

In step 208, the production agents, after being configured to restore the identified VMs, are deployed to the production hosts. The production agents may be deployed by installing the production agents in the production hosts hosting the identified VMs. In one or more embodiments of the invention, the production agent(s) are installed after the production agent has been configured in accordance with the restoration process(es). In other words, the production agent is both configured and installed in the production host in response to the restoration request.

In step 210, restore initiation requests are sent to the production agents. The restore initiation request may trigger the production agents to restore the virtual machines. In one or more embodiments of the invention, the restore initiation requests specify restoring the identified virtual machines. The restore initiation requests may further specify the restoration process to be performed on the virtual machines. The data protection manager may send a restore initiation request to each production agent configured in step 206.

FIG. 2B shows a flowchart for implementing a restoration process in accordance with one or more embodiments of the invention. The method shown in FIG. 2B may be performed by, for example, a production agent (146, FIG. 1A). Other components of the system illustrated in FIG. 1A may perform the method of FIG. 2B without departing from the invention.

In step 220, a restore initiation request is obtained. The restore initiation request may trigger the production agent to initiate a restoration of virtual machines as specified by the restore initiation request. The restore initiation request may be obtained by, for example, a data protection manager.

In step 222, automatic power-on of the virtual machines specified in the restore initiation request is disabled. The production agent, in accordance with the restoration process, disables the automatic power-on of the virtual machines. In this manner, the production agent dictates the order in which the virtual machines are powered on.

In step 224, a restoration of the virtual machines is initiated based on the restoration process. The restoration process may specify a sequence in which to restore the virtual machines. The restoration process may include obtaining a backup from a backup storage for each virtual machine that is to be restored and restoring the virtual machine using the obtained backup.

In one or more embodiments of the invention, after each virtual machine has been restored in accordance with the restoration process, the virtual machines are powered on in the sequence specified by the restoration process.

FIG. 2C shows a flowchart for updating a restoration policy repository in accordance with one or more embodiments of the invention. The method shown in FIG. 2B may be performed by, for example, a hypervisor (100, FIG. 1A). Other components of the system illustrated in FIG. 1A may perform the method of FIG. 2C without departing from the invention.

In step 240, a notification of a change (or an event that may trigger a change) in the virtual machine system is obtained. In one or more embodiments of the invention, the notification is obtained from a component of the production host (e.g., a hypervisor or a production agent) communicating with a virtual machine profiler of the data protection manager. The change specified in the notification may specify an addition or removal of a virtual machine in a production host, a change in the interdependencies of the virtual machines, and/or a change in components in the virtual machines (e.g., a new application is executing in an existing virtual machine.

In step 242, a determination is made about whether the change impacts the restoration policy of a restoration policy repository. In one or more embodiments of the invention, the data protection manager makes the determination for a change that specifies a removal of an entity (e.g., a virtual machine) by identifying one or more restoration policies stored in the backup policy repository that specify the entity and determining whether the identified restoration policies should be updated to not specify the removed entity.

In one or more embodiments of the invention, the data protection manager makes the determination for a notification that specifies a change in the interdependencies in the virtual machines. If the notification specifies a change in an interdependency of a virtual machine, the data protection manager identifies any restoration policy (or policies) that specifies any of the virtual machines specified in the notification and determine that the notification impacts the identified restoration policies.

If the change impacts the identified restoration policy (or policies), the method proceeds to step 244; otherwise, the method ends following step 242.

In one or more embodiments of the invention, if the notification specifies a change in the interdependencies, the data protection manager updates the restoration policy (or policies) to reflect the changes in interdependencies. The update may include modifying the order of the restoration process so that dependent virtual machines are restored after the virtual machines they depend on.

In step 244, the restoration policy is updated based on the change. In one or more embodiments of the invention, the restoration policy (or policies) are updated by: (i) adding an entity specified in the change to the restoration policy (or policies) if the change specifies that an entity has been added to a production host, (ii) removing an entity specified in the change from the backup policy (or policies) if the change specifies removing an entity from the virtual machine system, or (iii) introducing a restoration process to the restoration policy.

In one or more embodiments of the invention, the data protection manager generates a new restoration policy if the change specifies adding a new entity to the virtual machine system and no existing restoration policies specify the new entity.

Example

Figure 3A:
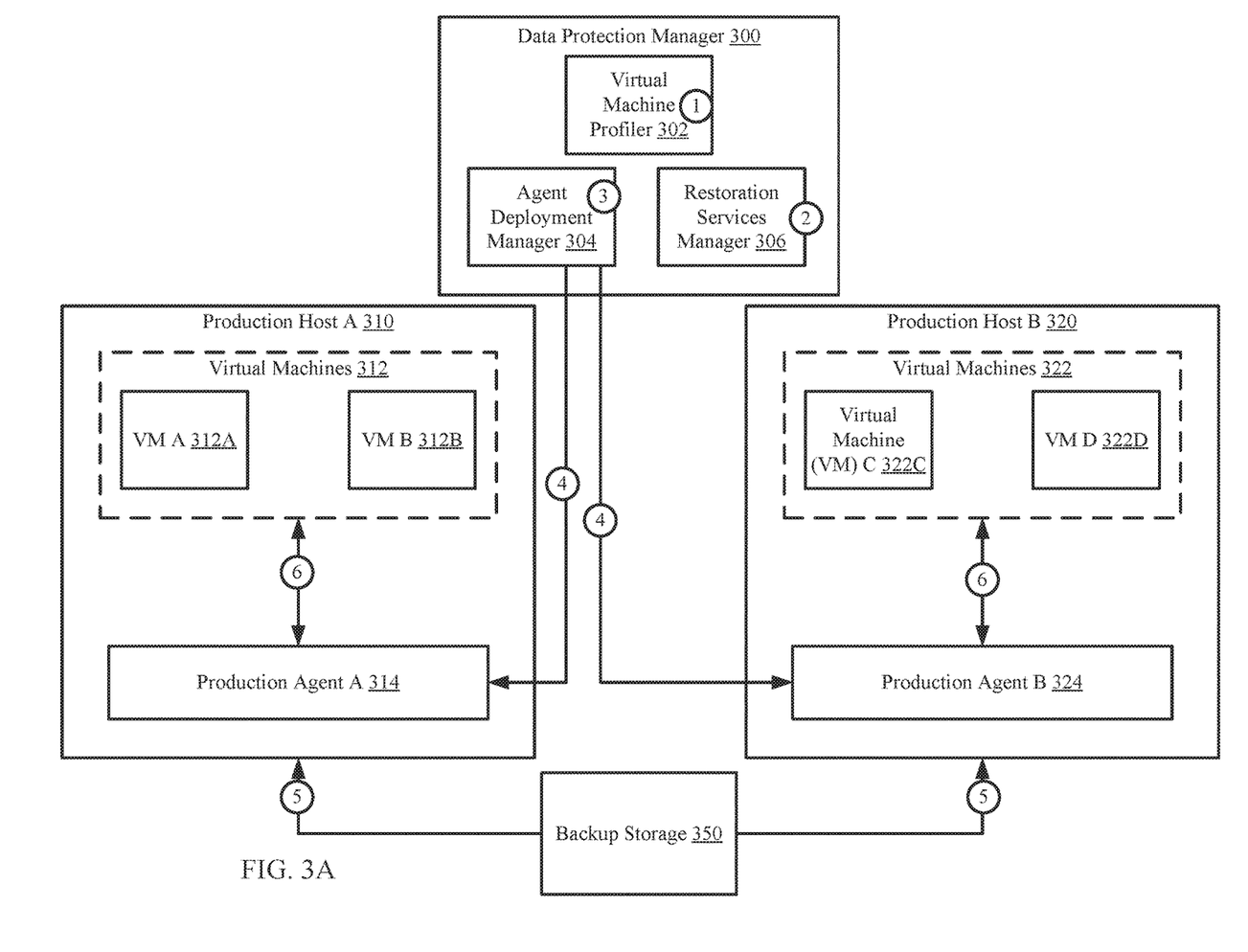
FIGS. 3A-3B show an example in accordance with one or more embodiments of the invention.
Figure 3B:
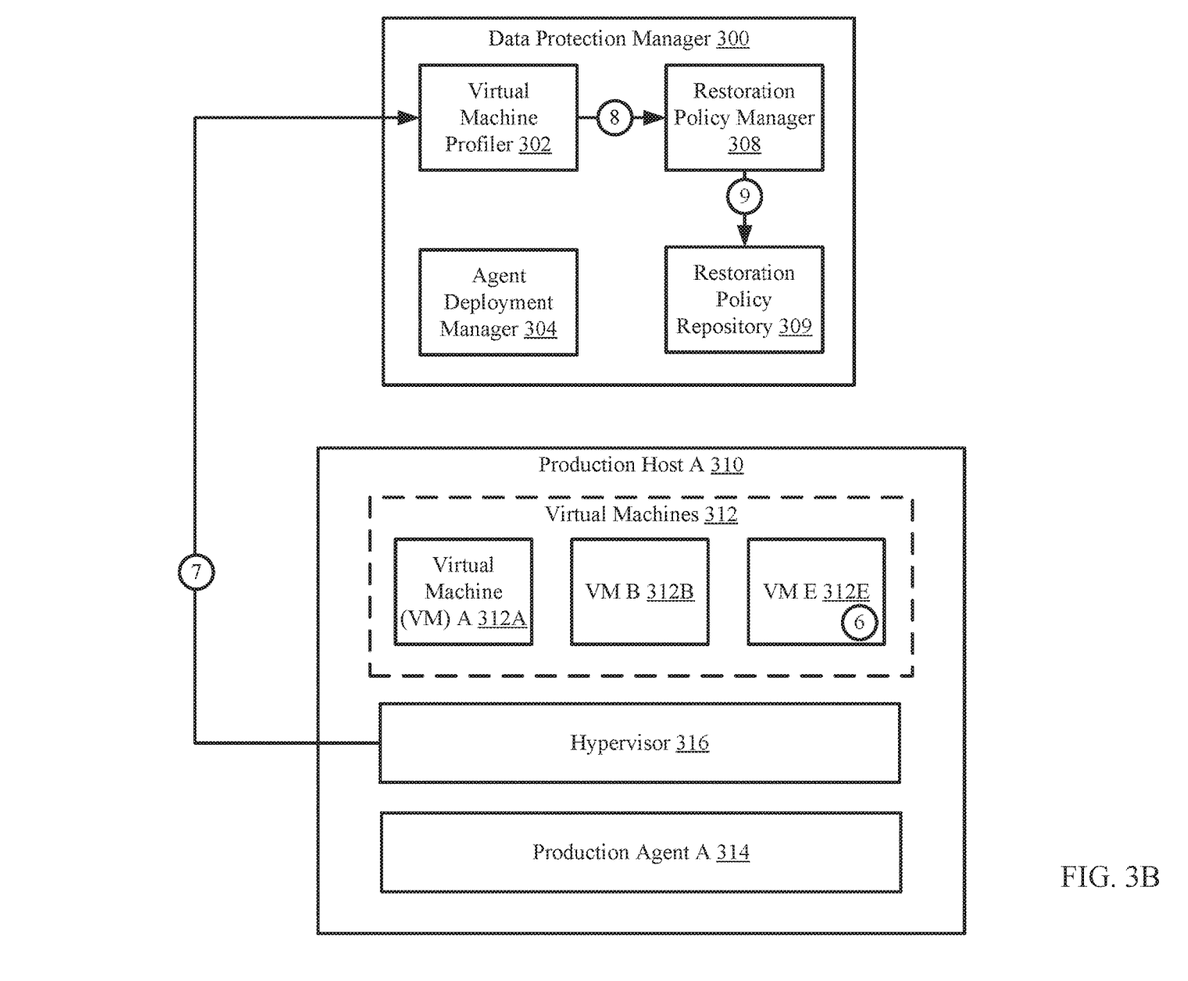

The following section describes an example. The example, illustrated in FIGS. 3A-3B, is not intended to limit the invention. Turning to the example, consider a scenario in which a system is to restore a number of virtual machines. The system, illustrated in FIGS. 3A-3B, may include a data protection manager (300). The data protection manager (300) may include a virtual machine profiler (302), an agent deployment manager (304), and a restoration services manager (306).

The virtual machine profiler (302), after obtaining a request to restore virtual machines A and C (312A, 322C), may analyze virtual machine information associated with the virtual machines to identify virtual machines to be restored [1]. The virtual machine information may be obtained at an earlier point in time. Using the virtual machine information, the virtual machine profiler (302) may determine that VM B (312B) depends on VM A (312A) and that VM D (322D) depends on VM C (322C). The virtual machine profiler (302), based on this determination, identifies VMs A, B, C, and D (312A, 312B, 322C, 322D) as virtual machines to be restored.

The restoration services manager (306) may use the identified virtual machines to generate two restoration processes [2]. A restoration process may include disabling the automatic power-on of both VM A (312A) and VM B (312B) and restoring VM A (312A) before restoring virtual machine B (312B). A second restoration process may include disabling the automatic power-on of both VM C (322C) and VM D (322D) and restoring VM C (322C) before restoring VM D (322D).

The restoration processes may further specify powering on each virtual machine in an order based on the order in which each virtual machine was restored. Specifically, the first restoration process may specify powering on VM A (312A) before powering on VM B (312B). The second restoration process may specify powering on VM C (322C) before powering on VM D (322D).

After the restoration processes have been generated by the restoration services manager, the agent deployment manager (304) may configure and install two production agents (314, 324) to each perform a restoration of their respective VMs in accordance with a restoration process [3] [4]. Specifically, production agent A (314) may be configured to perform the first restoration process and production agent B (324) may be configured to perform the second restoration process.

After installing the production agents, the restoration process may be initiated. The restoration processes includes obtaining backups associated with the virtual machines form a backup storage (350) [5]. The production agents, using the obtained backups, may restore the virtual machines in accordance with their respective restoration processes [6].

Referring to FIG. 3B, at a later point in time, a new VM is introduced to the virtual machine system [7]. The production host (310), at this later point in time, includes the new VM (312E). The new VM (312E) may be a virtual machine dependent on VM A (312A). A hypervisor (316) of the production host (310) sends a notification to the virtual machine profiler (302) that specifies the new VM.[8] The virtual machine profiler (302) sends a second notification to a restoration policy manager (308) about the new VM [9]. The restoration policy manager (308), using the second notification, determines that the change impacts a restoration policy that specifies VM A (312A). The restoration policy manager (308) may update the restoration policy by modifying a restoration process in the restoration policy to specify restoring the new virtual machine (312E) after restoring VM A (312A) in the restoration policy [10].

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the efficiency of restoring a number of virtual machines by intelligently identifying virtual machines that are to be restored and determining an order of restoration based on an interdependency associated with each identified virtual machine. By intelligently determining a restoration process prior to performing the restorations, embodiments of the invention are able to configure production agents to restore the virtual machines in an efficient manner By ensuring that virtual machines are restored in a predetermined manner, embodiments of the invention reduce the inefficiency of powering on a virtual machine that cannot be used or accessed until another virtual machine has been restored and powered on. In this manner, the time taken to wait before being able to access or otherwise use a virtual machine after being restored is reduced.

Embodiments of the invention also improve the efficiency of implementing restoration policies by automatically updating the restoration policies based on changes to virtual machines. Embodiments of the invention, by automatically updating the restoration policies, reduce the need for an administrator to manually update the restoration policies. In a conventional implementation, the administrator may update the restoration policies based on their experience with the changes to the system. Embodiments of the invention reduce the human error of updating restoration policies that is caused by observing a system with a large number of virtual machines and not capturing every change that may impact the restoration policies.

Thus, embodiments of the invention may address the problem of inefficient use of computing resources. This problem arises due to the technological nature of the environment in which restoration policies are implemented.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for performing virtual machine restorations, the method comprising:
   obtaining, by a data protection manager, a restoration request; and
   in response to the restoration request:
      identifying a plurality of virtual machines (VMs), in a virtual machine environment, to restore based on the restoration request;
      determining a restoration process based on the plurality of virtual machines;
      initiating a deployment of a production agent based on the restoration process,
      wherein initiating the deployment of the production agent comprises:
         initiating, based on the restoration process, installation of the production agent on a production host;
         initiating a configuration of the production agent to disable an automatic power-on of at least the portion of the plurality of VMs; and
         initiating a further configuration of the production agent to restore at least the portion of the plurality of the VMs based on the restoration process,
         wherein the restoration process specifies an order of powering on of the at least the portion of the plurality of VMs,
      wherein the production agent initiates a restoration on at least a second portion of the plurality of VMs, wherein the second portion of the plurality of VMs comprises the portion of the plurality of VMs;
   after initiating the deployment:
      identifying a change in the virtual machine environment;

making a determination that the change affects a restoration policy;
based on the determination, updating the restoration policy to obtain an updated restoration policy;
after making the determination, obtaining a second restoration request;
in response to the second restoration request:
identifying a second plurality of VMs, in the virtual machine environment, to restore based on the second restoration request;
determining a second restoration process based on the second plurality of VMs, wherein the second restoration process is based on the updated restoration policy; and
initiating a second deployment of a second production agent based on the second restoration process.

2. The method of claim 1, wherein the order is determined using the restoration policy.

3. The method of claim 1, wherein the order is based on an interdependency between at least a first VM of the plurality of VMs and a second VM of the plurality of VMs.

4. The method of claim 1,
wherein the plurality of VMs comprises a first portion of VMs and a second portion of VMs, and wherein the only first portion of VMs is specified in the restoration request, and
wherein at least a VM of the second portion of VMs depends on a VM of the first portion of VMs.

5. The method of claim 1, wherein the restoration process is obtained from a restoration policy of a restoration policy repository.

6. A non-transitory computer readable medium comprising computer readable program code, which when executed by a computer processor enables the computer processor to perform a method for performing a backup operation, the method comprising:
obtaining, by a data protection manager, a restoration request; and
in response to the restoration request:
identifying a plurality of virtual machines (VMs), in a virtual machine environment, to restore based on the restoration request;
determining a restoration process based on the plurality of virtual machines; and
initiating a deployment of a production agent based on the restoration process,
wherein initiating the deployment of the production agent comprises:
initiating, based on the restoration process, installation of the production agent on a production host;
initiating a configuration of the production agent to disable an automatic power-on of at least the portion of the plurality of VMs; and
initiating a further configuration of the production agent to restore at least the portion of the plurality of the VMs based on the restoration process,
wherein the restoration process specifies an order of powering-on of the at least the portion of the plurality of VMs,
wherein the production agent initiates a restoration on at least a second portion of the plurality of VMs, wherein the second portion of the plurality of VMs comprises the portion of the plurality of VMs;
after initiating the deployment:
identifying a change in the virtual machine environment;
making a determination that the change affects a restoration policy;
based on the determination, updating the restoration policy to obtain an updated restoration policy;
after making the determination, obtaining a second restoration request;
in response to the second restoration request:
identifying a second plurality of VMs, in the virtual machine environment, to restore based on the second restoration request;
determining a second restoration process based on the second plurality of VMs, wherein the second restoration process is based on the updated restoration policy; and
initiating a second deployment of a second production agent based on the second restoration process.

7. The non-transitory computer readable medium of claim 6, wherein the order is determined using the restoration policy.

8. The non-transitory computer readable medium of claim 6, wherein the order is based on an interdependency between at least a first VM of the plurality of VMs and a second VM of the plurality of VMs.

9. The non-transitory computer readable medium of claim 6,
wherein the plurality of VMs comprises a first portion of VMs and a second portion of VMs, and wherein the only first portion of VMs is specified in the restoration request, and
wherein at least a VM of the second portion of VMs depends on a VM of the first portion of VMs.

10. The non-transitory computer readable medium of claim 6, wherein the restoration process is obtained from a restoration policy of a restoration policy repository.

11. A system, comprising:
a processor; and
memory comprising instructions which, when executed by the processor, perform a method, the method comprising:
obtaining, by a data protection manager, a restoration request; and
in response to the restoration request:
identifying a plurality of virtual machines (VMs), in a virtual machine environment, to restore based on the restoration request;
determining a restoration process based on the plurality of virtual machines; and
initiating a deployment of a production agent based on the restoration process,
wherein initiating the deployment of the production agent comprises:
initiating, based on the restoration process, installation of the production agent on a production host;
initiating a configuration of the production agent to disable an automatic power-on of at least the portion of the plurality of VMs; and
initiating a further configuration of the production agent to restore at least the portion of the plurality of the VMs based on the restoration process,
wherein the restoration process specifies an order of powering-on of the at least the portion of the plurality of VMs,
wherein the production agent initiates a restoration on at least a second portion of the plurality of VMs, wherein the second portion of the plurality of VMs comprises the portion of the plurality of VMs;

after initiating the deployment:
- identifying a change in the virtual machine environment;
- making a determination that the change affects a restoration policy;
- based on the determination, updating the restoration policy to obtain an updated restoration policy;
- after making the determination, obtaining a second restoration request;
- in response to the second restoration request:
  - identifying a second plurality of VMs, in the virtual machine environment, to restore based on the second restoration request;
  - determining a second restoration process based on the second plurality of VMs, wherein the second restoration process is based on the updated restoration policy; and
  - initiating a second deployment of a second production agent based on the second restoration process.

12. The system of claim 11, wherein the order is based on an interdependency between at least a first virtual machine of the plurality of virtual machines and a second virtual machine of the plurality of virtual machines.

13. The system of claim 11,
wherein the plurality of virtual machines VMs comprises a first portion of virtual machines VMs and a second portion of virtual machines VMs, and wherein the only first portion of virtual machines VMs is specified in the restoration request, and
wherein at least a virtual machine VM of the second portion of virtual machines VMs depends on a virtual machine VM of the first portion of virtual machines VMs.

14. The system of claim 11, wherein the restoration process is obtained from the restoration policy of a restoration policy repository.

* * * * *